(12) United States Patent
Liu et al.

(10) Patent No.: US 8,049,781 B2
(45) Date of Patent: Nov. 1, 2011

(54) MONITOR WITH CAMERA

(75) Inventors: Yi-Hong Liu, Shenzhen (CN);
Yun-Shan Xiao, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 432 days.

(21) Appl. No.: 12/236,521

(22) Filed: Sep. 24, 2008

(65) Prior Publication Data
US 2010/0013936 A1   Jan. 21, 2010

(30) Foreign Application Priority Data
Jul. 18, 2008  (CN) .......................... 2008 1 0302804

(51) Int. Cl.
*H04N 5/225* (2006.01)
(52) U.S. Cl. .............. 348/207.1; 348/373; 348/552; 710/313
(58) Field of Classification Search ........... 348/207.1
See application file for complete search history.

(56) References Cited

U.S. PATENT DOCUMENTS

| | | | |
|---|---|---|---|
| 6,577,337 B1 * | 6/2003 | Kang | 348/207.1 |
| 6,624,797 B1 | 9/2003 | Wheeler et al. | |
| 7,451,328 B2 * | 11/2008 | Hsieh | 713/300 |
| 2001/0014006 A1 * | 8/2001 | Kim et al. | 361/683 |

FOREIGN PATENT DOCUMENTS
CN 2870067 Y 2/2007
* cited by examiner

*Primary Examiner* — Sinh Tran
*Assistant Examiner* — Paul Berardesca
(74) *Attorney, Agent, or Firm* — Altis Law Group, Inc.

(57) ABSTRACT

A monitor includes a display circuit used for controlling display of the monitor. A camera is disposed on a frame of the monitor, and includes a plurality of signal pins. A power circuit is used for providing power to the display circuit and the camera. A monitor video interface mates with a video interface of a motherboard of a host computer. The monitor video interface includes a plurality of video pins connected to the display circuit, and a plurality of idle pins connected to the plurality of signal pins of the camera. A power pin and a ground pin of the camera are correspondingly connected to a power pin and a ground pin of the power circuit.

6 Claims, 2 Drawing Sheets

MONITOR WITH CAMERA

BACKGROUND

1. Technical Field

The present disclosure relates to computer monitors, and particularly to a monitor with a camera.

2. Description of Related Art

Nowadays, computers are widely used by persons for word processing, multimedia playing, and accessing the Internet for both research and communication. Cameras are computer peripherals which may be used for carrying out video communication between peers connected by the Internet. The cameras are used for capturing images and/or video and transmitting the images and/or video to another computer via the Internet. However, since cameras are not conveniently positioned, they are not used efficiently.

What is needed, therefore, is a camera to amend the aforementioned problems.

DETAILED DESCRIPTION

Figure 1:
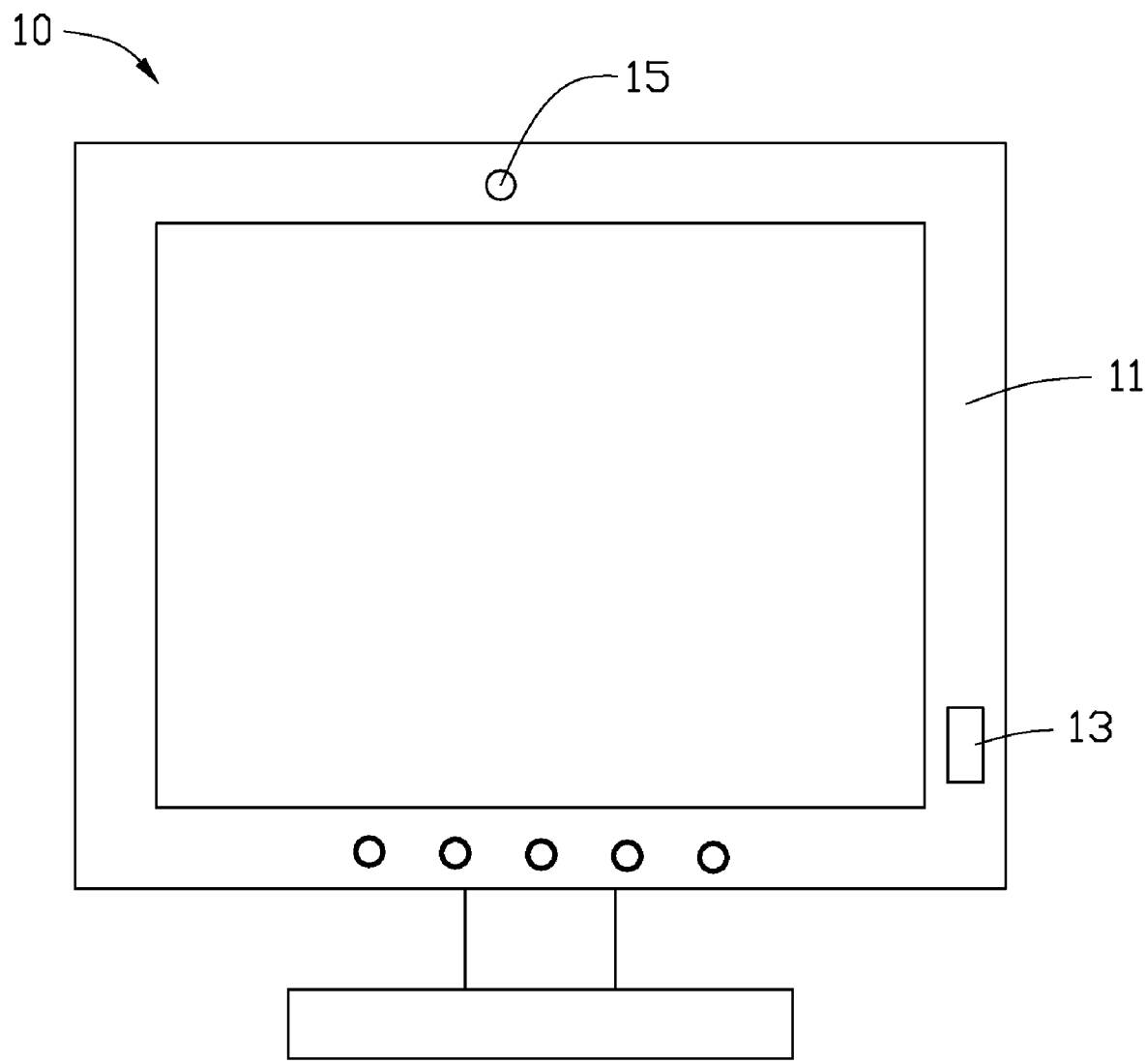
FIG. 1 is a schematic view of a monitor with a camera in accordance with one embodiment of the present disclosure.
Figure 2:
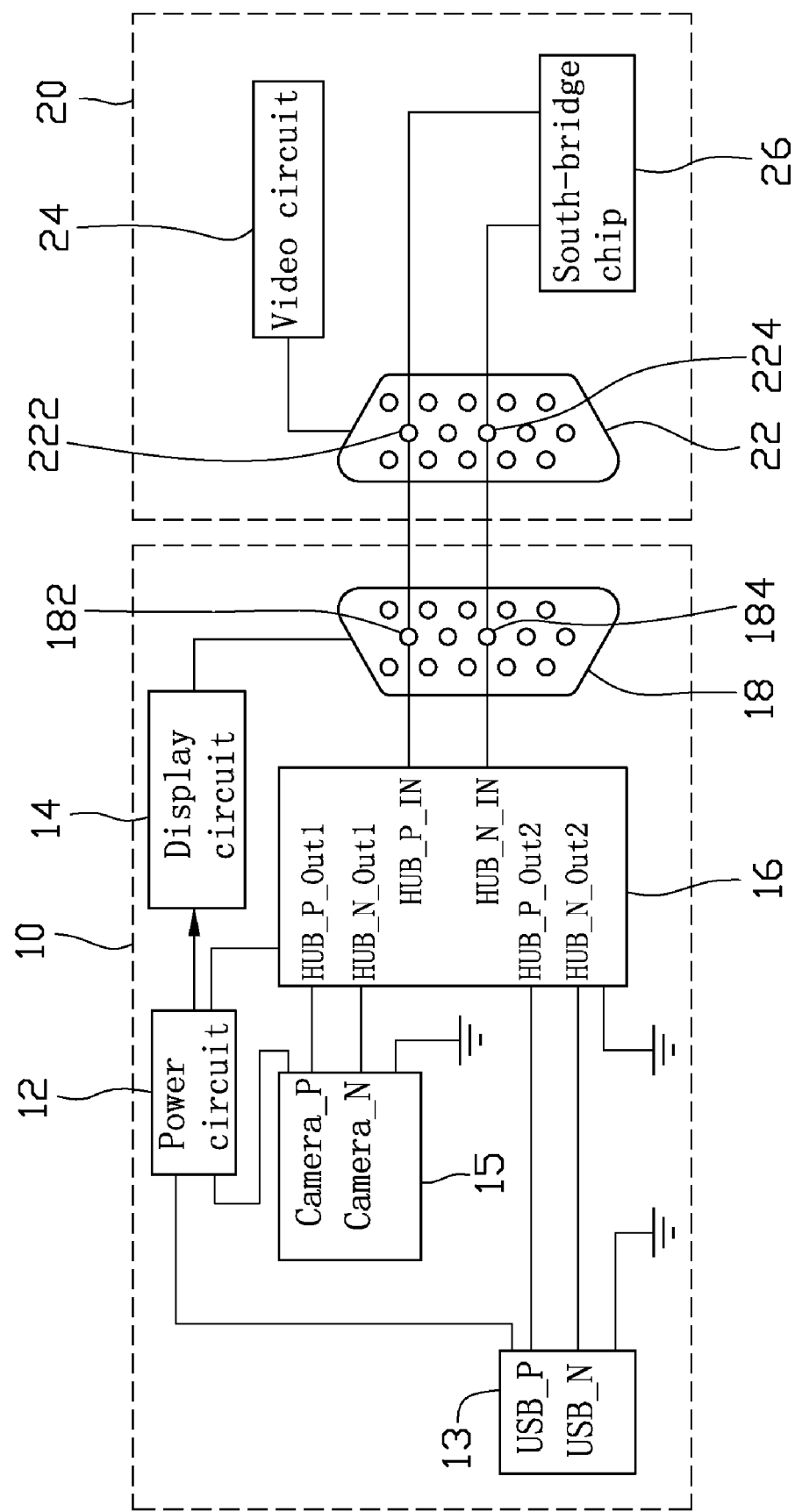
FIG. 2 is a block diagram of one embodiment of a circuit and a motherboard for supporting the monitor of FIG. 1.

Referring to FIGS. 1 and 2, one embodiment of a monitor 10 includes a power circuit 12, a universal serial bus (USB) interface 13, a display circuit 14 configured for controlling display of the monitor, a camera 15, a USB hub chip 16, and a monitor video interface such as a video graphics array (VGA) interface 18.

In the illustrated embodiment, the USB interface 13 is set in a left side of a frame 11 of the monitor 10 and used for connecting a USB peripheral device, such as a USB keyboard, a USB mouse, etc. The camera 15 is set in a top of the frame 11 of the monitor 10. It may be understood that the USB interface 13 and the camera 15 can be set in other locations of the monitor 10 according to need.

The power circuit 12, the display circuit 14, and the USB hub chip 16 are set on a circuit board (not shown) within the monitor 10. The power circuit 12 is connected to the display circuit 14 to provide power for the display circuit 14. The power circuit 12 is connected to a power pin of the USB hub chip 16, a power pin of the USB interface 13, and a power pin of the camera 15 to provide power thereto. Two idle pins 182, 184 of the monitor VGA interface 18 are connected to two input pins HUB_P_IN, HUB_N_IN of the USB hub chip 16. Two output pins HUB_P_Out1 and HUB_N_Out1 of the USB hub chip 16 are connected to signal pins Camera_P and Camera_N of the camera 15. Two output pins HUB_P_Out2 and HUB_N_Out2 of the USB hub chip 16 are connected to signal pins USB_P and USB_N of the USB interface 13. A ground pin of the USB hub chip 16, a ground pin of the USB interface 16, and a ground pin of the camera 15 are grounded. Video pins of the monitor VGA interface 18 are connected to the display circuit 14.

A motherboard 20, that is configured for use in an electronic device such as a host computer (not shown) connected to the monitor 10, for supporting the monitor 10 includes a motherboard video interface such as a VGA interface 22, a video circuit 24, and a south-bridge chip 26. Two idle pins 222, 224 of the motherboard VGA interface 22 are respectively connected to two USB signal pins of the south-bridge chip 26. The two pins 222, 224 of the motherboard VGA interface 22 are corresponding to the two pins 182, 184 of the monitor VGA interface 18. When the monitor VGA interface 18 is plugged into the motherboard VGA interface 22, the two pins 222, 224 of the motherboard VGA interface 22 are connected to the two pins 182, 184 of the monitor VGA interface 18 correspondingly. The video pins of the motherboard VGA interface 22 are connected to the video pins of the monitor VGA interface 18, and connected to the video circuit 24.

In use, the monitor VGA interface 18 is plugged into the motherboard VGA interface 22. The power circuit 12 receives AC power and converts the AC power to a 12V DC power and a 5V DC power. The 12V DC power is provided to the display circuit 14, and the 5V DC power is provided to the USB hub chip 16, the USB interface 13, and the camera 15. The USB hub chip 16, the USB interface 13, and the camera 15 are capable of communicating with the motherboard 20 via the monitor VGA interface 18 and motherboard VGA interface 22. Therefore the monitor 10 not only has a display function but also has a camera function and a USB interface function.

If there is no need to use the USB interface 13, the USB hub chip 16 can be omitted.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A monitor, comprising:
a display circuit for controlling display of the monitor;
a camera disposed on a frame of the monitor, comprising a plurality of signal pins;
a power circuit for providing power to the display circuit and the camera;
a monitor video interface mating with a video interface of a motherboard of a host computer, the monitor video interface comprising a plurality of video pins connected to the display circuit, and a plurality of idle pins connected to the plurality of signal pins of the camera, wherein a power pin and a ground pin of the camera are correspondingly connected to a power pin and a ground pin of the power circuit;
a universal serial bus (USB) hub chip; and
a USB interface disposed on a frame of the monitor, comprising a plurality of signal pins;
wherein input pins of the USB hub chip are connected to the plurality of idle pins of the monitor video interface, output pins of the USB hub chip are connected to the plurality of signal pins of the USB interface and the plurality of signal pins of the camera, and a power pin and a ground pin of the USB interface are correspondingly connected to the power pin and the ground pin of the power circuit.

2. The monitor as claimed in claim 1, wherein the camera has a USB interface.

3. The monitor as claimed in claim 1, wherein the monitor video interface is a monitor video graphics array (VGA) interface.

4. A computer system, comprising:
a display circuit for controlling display of a monitor;
a camera disposed on a frame of the monitor, comprising a plurality of signal pins;

a power circuit for providing power to the display circuit and the camera;

a monitor video interface mating with a video interface of a motherboard of a host computer, the monitor video interface comprising a plurality of video pins connected to the display circuit, and a plurality of idle pins connected to the plurality of signal pins of the camera and a plurality of idle pins of the motherboard video interface which are connected to a chip of the motherboard, wherein a power pin and a ground pin of the camera are correspondingly connected to a power pin and a ground pin of the power circuit;

a universal serial (USB) hub chip; and a USB interface disposed on a frame of the monitor, comprising a plurality of signal pins, wherein input pins of the USB hub chip are connected to the plurality of idle pins of the monitor video interface, output pins of the USB hub chip are connected to the plurality of signal pins of the USB interface and the plurality of signal pins of the camera, and a power pin and a ground pin of the USB interface are correspondingly connected to the power pin and the ground pin of the power circuit.

5. The monitor as claimed in claim 4, wherein the camera has a USB interface, and wherein the chip of the motherboard is a south-bridge chip.

6. The monitor as claimed in claim 4, wherein the monitor video interface is a monitor video graphics array (VGA) interface, and the motherboard video interface is a motherboard monitor VGA interface.

* * * * *